March 2, 1971  F. DEDEK  3,566,660

MANUFACTURING METHOD TO PRODUCE PRINTING TYPE

Original Filed Nov. 16, 1967  3 Sheets-Sheet 1

INVENTOR.
FRANK DEDEK

BY Ralzemond B. Parker
AGENT

March 2, 1971  F. DEDEK  3,566,660

MANUFACTURING METHOD TO PRODUCE PRINTING TYPE

Original Filed Nov. 13, 1967  3 Sheets-Sheet 2

INVENTOR.
FRANK DEDEK

BY Rozemond B. Parker

AGENT

March 2, 1971      F. DEDEK      3,566,660

MANUFACTURING METHOD TO PRODUCE PRINTING TYPE

Original Filed Nov. 16, 1967      3 Sheets-Sheet 3

INVENTOR.
FRANK DEDEK

BY *Ralgemond B. Parker*

AGENT

United States Patent Office 3,566,660
Patented Mar. 2, 1971

3,566,660
MANUFACTURING METHOD TO PRODUCE
PRINTING TYPE
Frank Dedek, Westland, Mich., assignor to Burroughs
Corporation, Detroit, Mich.
Continuation of application Ser. No. 683,524, Nov. 16, 1967. This application Feb. 28, 1968, Ser. No. 708,892
Int. Cl. B21d 28/00, 31/00, 31/06
U.S. Cl. 72—339                                    15 Claims

ABSTRACT OF THE DISCLOSURE

A method of forming printing type from a sheet metal strip which is passed through a progressive die, the method including the steps of indexing the metal strip through the die, producing printing type blanks with integrally connected head and hardened shank portions by punching and swaging operations and later severing each completed type blank from the strip. The head portion of the several type blank then is subjected to a character forming operation while the shank portion is firmly clamped in a holding fixture.

BACKGROUND OF THE INVENTION

This is a continuing application of application Ser. No. 683,524, filed Nov. 16, 1967, and now abandoned.

The present invention is directed to a method of fabricating printing type which includes the step of passing a strip of relatively soft sheet metal through a progressive die. Prior art methods have utilized milling machine operation to fabricate individual printing type from metal stock. The milling operations have been costly and necessitated additional burring operations to eliminate burrs formed during milling. The secondary operations of perforating slots in the already formed shank portion of the printing type and machining the head and shank to final size which are utilized in the milling operation have been eliminated by the present invention.

Progressive die blanking operations have been used in the past to produce metal parts from metal sheet stock. However, the blanking process has not been utilized in the past to fabricate printing type. The disadvantage which discouraged the use of this technique was that in the subsequent character forming on the head portion of the type blank, the shank portion became greatly distorted due to metal flow. The previously mentioned milling method of fabricating printing type was therefore used instead, the head portion of the printing type being fabricated first and the shank portion subsequently being machined to final size.

SUMMARY OF THE INVENTION

The present invention relates to the fabrication of printing type, preferably such type used in business machines. A printing type blank is fabricated from a sheet of relatively soft metal and has an integrally connected head and shank portion. The method of the present invention utilizes a progressive die into which a strip of soft metal is fed from a coil at the entrance thereto. A series of operations is then performed on the strip while it is indexed through the die.

The first operation punches pilot holes adjacent to each side edge of the stock. In the second operation a punch perforates two apertures, or windows, in the strip leaving a thin metal slab between the apertures. In the third operation, the shank and head portions of a blank are formed by swaging the thin metal slab. In this operation the shank is widened substantially in the plane of the sheet and thinned relative to the thickness of the sheet. The hardness of the shank portion is increased during swaging as the metal formnig the shank is cold worked by a set of dies. At the fourth operation excess metal formed during swaging is trimmed off the side of the blank, reducing the width of both the head and shank portions, and the shank to a width less than that of the head. The fifth operation punches a rectangular retaining slot extending longitudinally through the shank portion of the blank. At the sixth operation, the shank is reduced to the desired width. At the seventh operation, to obtain a smooth edge, the type blank is partially punched from the remaining stock. At the last operation, the type blank is punched completely from the stock.

The type blank, with the completed shank but incompletely formed head, is then inserted into a holding fixture and a print character is then formed on the head of the blank by a kneading operation, the kneading causing excess metal to be left around the periphery of the head due to metal flow which is later trimmed away by a trimmer die. The shank is not deformed during this operation due to its hardened state and the close fit of the holding fixture. During this latter operation, the shank portion of the partially formed type is tightly gripped by the fixture including the insertion of a part into the slot of the shank to prevent possible metal flow from reducing the size of the slot.

The manufacturing method of the present invention substantially reduces the cost of fabricating printing type. A number of machining operations are eliminated by fabricating the type blank on a progressive die with a completed blank being produced each time the die closes. The novel method disclosed herein utilizes less machine operations and enables the type to be economically mass produced.

The object of this invention is to provide a novel method of manufacturing printing type.

Another object of the present invention is to provide a novel manufacturing method which substantially reduces the cost of fabricating printing type.

A further object of this invention is to provide a novel method of manufacturing printing type by utilizing a progressive die which performs several operations on a soft metal strip being indexed through the die.

A further object of this invention is to provide a novel method of producing printing type utilizing a progressive die which produces a printing blank with a head and a hardened shank portion, shapes the shank portion, and subsequently forms a printing character on the head portion of the type blank while the shank portion is tightly clamped in a holding fixture, the hardened shank and holding fixture preventing metal flow during the character forming operation.

The above listed objects and other aspects of the invention will be further explained in the following detailed description. For a more complete understanding of the invention, reference may be had to the following detailed description in conjunction with the drawings.

DESCRIPTION OF A PREFERRED EMBODIMENT

Figure 1:
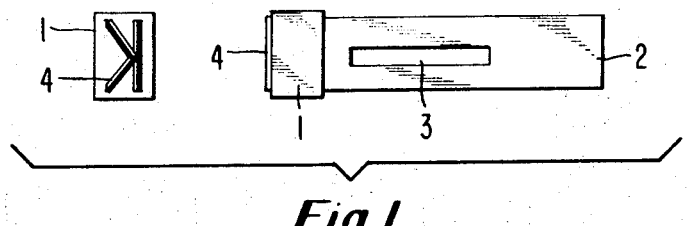
FIG. 1 shows two plan views of a printing type formed in accordance with the invention.

Referring now to FIG. 1, there is shown a plan view of a printing type, preferably used in the typewriter section of business machines, formed in accordance with the method of the present invention. The type is made from a soft metal material, preferably of soft steel, and comprises a head portion 1 and an integrally connected shank portion 2. Also shown is a rectangularly shaped retaining slot 3 located in the shank 2 of the printing type. Adjacent the plan view of the printing type is a front view of the head showing a print character 4 formed thereupon.

Figure 2:
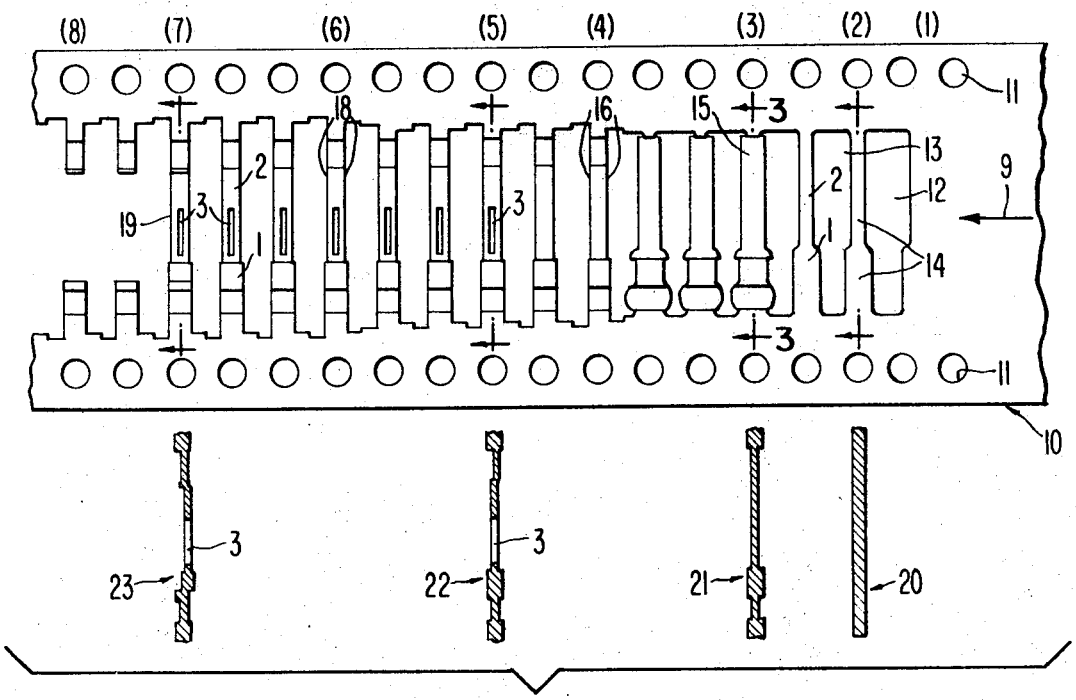
FIG. 2 is a plan view showing a strip of soft metal from which the printing type is formed and showing various operations in the formation of the type blanks.

Referring now to FIG. 2, there is shown a strip of soft metal 10 from which the printing type of the present invention is formed and also reflecting various operations in the formation of a type blank. The metal 10, in the present embodiment, may be, for example, of a Rockwell "B" 60 hardness which is soft enough to permit character formation. The stations where the operations of the invention are performed are labeled (1)–(8). Each of the eight stations performs its operation every time the progressive die closes on the strip between its indexing movements through the die. Thus, as the last station (8) is separating a type blank from that portion of the metal strip just before it leaves the die, the first station (1) is punching a set of pilot holes in the strip material just entering the die.

The strip 10 is fed from a coil and is advanced from right to left, as illustrated by arrow 9. The thickness of the continuous strip is equal to the desired thickness of the type head. The soft metal strip 10 is inserted in the die to a predetermined position and the punch is operated at station (1), perforating the two pilot holes 11, one near each edge of the strip 10, for indexing and registration purposes. Pilot pins in the die will fit through these holes as the die closes to perform each punch operation. The distance between each pilot hole is preferably 0.375 inch. The distance between stations is either this value or some multiple of it. The larger distances are necessary because some of the punches are too large to be located within 0.375 inch of each other. If a type blank is advanced to an idle position between operating stations, it merely remains there untouched until it is advanced to the next station.

The metal strip 10 is advanced one position (0.375 inch) and the die closes again to perform the next punch operation at station (2). At this station, two apertures, or windows, 12 and 13 are perforated in the strip leaving a thin metal slab 14 between the apertures. Slab 14 is the type blank in its initial stage of formation.

The metal strip 10 is then advanced two more positions (0.750 inch) to the third station where the slab 14 will undergo a swaging operation forming a type blank with integral head and shank portions 1 and 2, respectively, resulting in excess metal 15 being formed. This operation reduces the thickness of the shank portion of the type blank in a direction perpendicular to the strip and widens it in the plane of the strip, while the desired head portion is not worked upon as it is initially at the desired thickness. The die used in the swaging step is formed such that the flow of metal during the swaging process is controlled to provide a shank of uniform thickness having sharp corners where the metal changes in thickness between the shank and head portions. The metal working performed on the shank metal portion of the type blank changes its hardness from a Rockwell "B" 60 to a Rockwell "B" 90. The head portion of the type blank remains at the Rockwell "B" 60 hardness.

The strip 10 is then advanced three more positions (1.125 inches) to reach the fourth station. At this station the excess metal formed during the swaging operation is trimmed from the type blank edges 16. The blanks are left approximately .006 inch oversize, in anticipation of a final sizing operation.

Metal strip 10 is then advanced two more positions (.750 inch) to the fifth station where the longitudinal rectangular retaining slot 3 is punched in the type shank and then is advanced three more positions (1.125 iches) to the sixth station. At this station the final sizing occurs when the die removes the .006 inch of excess metal from the sides of the blank as indicated at 18.

The strip 10 is then advanced three more positions (1.125 inches) to the seventh station where the type blank 19 is partially punched from the remaining stock. The amount the blank will be punched downward at this station is controlled by the amount that a plastic member within the die (not shown in the drawing) will be compressed by the punching impact. The type blank is not punched completely from the strip in one operation in order to prevent bending of the blank.

The metal strip 10 is then advanced two more positions (.750 inch) to the final station (8) where the type blank is punched or severed completely from the remainder of the strip.

The four sectional views adjacent metal strip 10 in FIG. 2, illustrated by reference numerals 20, 21, 22, and 23, detail the operations performed on the strip 10 at stations (2), (3), (5) and (7), respectively. At station (2), the slab 14 still retains its original cross-sectional area as shown in view 20. At station (3), the swaging operation has been completed by the swaging die resulting in the cross-sectional view shown at 21. At the fifth station, slot 3 is punched through the blank as shown in view 22. The final blank form 19, before being severed from metal strip 10, is shown at station (7) in cross-sectional view 23.

The severed type blanks are then placed in an abrasive filled container which is caused to rotate or tumble in a spiral motion, producing burr free type blanks with an improved micro-finish.

The type blank is then ready to have a print character formed on its head portion by a separate operation, preferably by a kneading process. The shoulder formed by the difference in cross-sectional area between the shank and head portions serves as an abutment to hold the blank during the kneading operation. The holding fixture utilized during the character formation will be discussed below with reference to FIGS. 4–8. The kneading operation causes metal flow in the head portion of the type blank, whereas the swage-hardened metal shank portion 2 remains undistorted. The excess metal is removed with a trimmer die in a separate operation.

Figure 3:
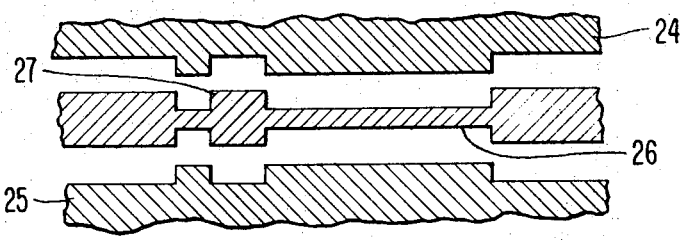
FIG. 3 is a sectional view on an enlarged scale showing a section of FIG. 2 taken along the cutting plane 3—3 of FIG. 2 and showing the swaging dies forming the shank and head portions of the type blank.

Referring now to FIG. 3, a sectional view on an enlarged scale along line 3—3 of FIG. 2 shows the swaging dies 24 and 25 that form the ultimate hardened shank portion 26 of the printing type blank. The head portion 27 is initially formed because the dies 24 and 25 have not exerted pressure on that part of the metal slab 14 (FIG. 2).

Figure 4:
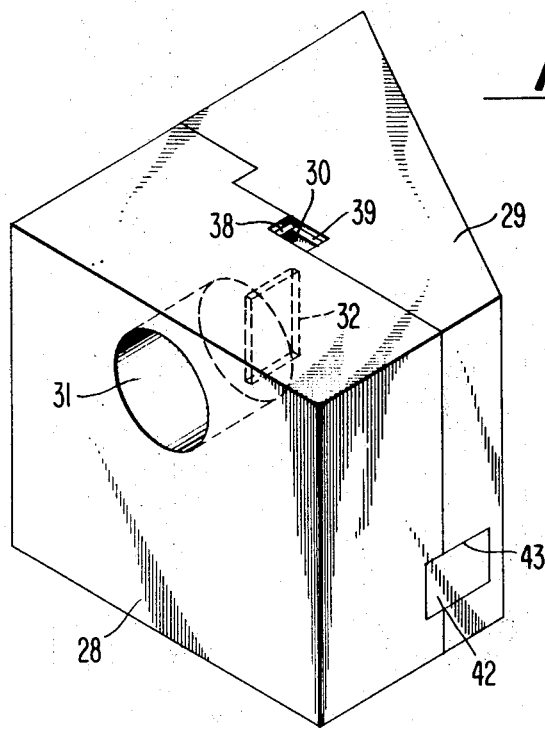
FIG. 4 is a perspective view of the assembled type blank holding fixture utilized in the present invention.

Referring now to FIG. 4, there is shown the assembled holding fixture utilized in the present invention. The holding fixture comprises a pair of mating blocks 28 and 29 having a series of step-like projections on their working faces. The assembled pair of mating blocks provides a central aperture or chamber 30 for receiving and holding the inserted type blank during the character forming operation. A cylindical aperture 31 is formed on one side of the mating block 28. The aperture 31 extends partially through the thickness of the mating block. A narrow rectangular slot 32 is formed as shown in the remaining thickness of the mating block 28 and extends to chamber 30.

Figure 5:
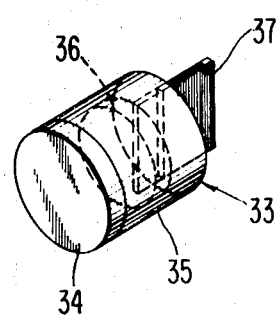
FIG. 5 is a perspective view of a plug utilized with the fixture.

Referring now to FIG. 5, there is shown a plug 33 used with the holding fixture shown in FIG. 4. The plug 33 comprises metal disk 34, a body of resilient plastic material 35, such as Adeprene, and a headed pin 36 which includes a blade or knife shaped rectangular extension 37. Adeprene is a trademark describing a urethene elastomer manufactured by E. I. du Pont de Nemours and Company. Adeprene has a high compression factor and good wearing qualities. Ordinary rubber or a steel spring could alternatively be used as the resilient body. The headed end of the pin 36 is embedded (or floats) within the resilient body 35 while the extension 37 projects beyond the body 35 and is dimensionally shaped to fit the slot 3 of the blank.

Figure 6:
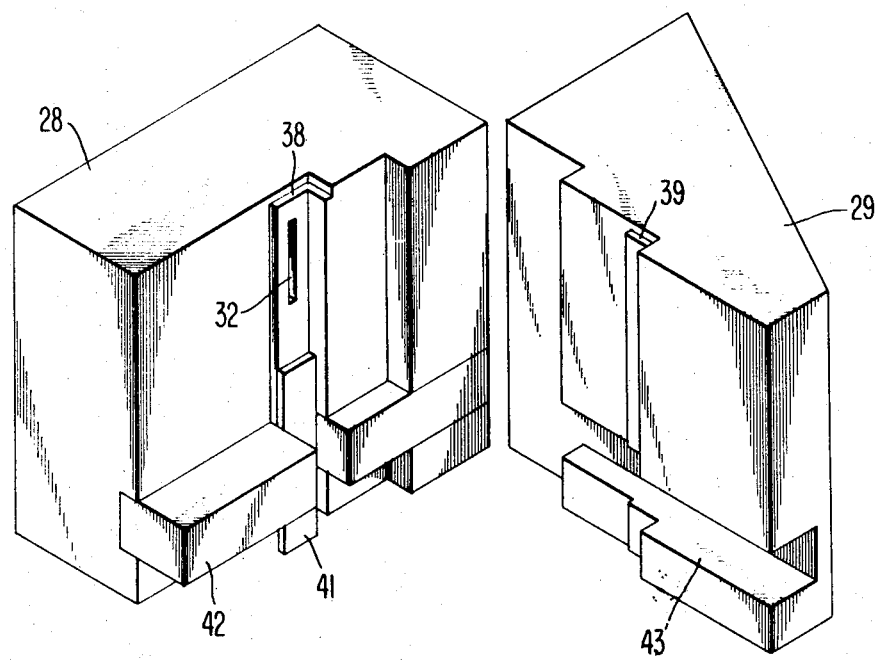
FIG. 6 is a perspective view of the type blank holding fixture in its disassembled position.

Referring now to FIG. 6, there is shown the holding fixture in its disassembled position, comprising mating blocks 28 and 29 having a series of step-like projections on their working faces. When assembled as shown in FIG. 4, the pair of mating blocks provide a central aperture or chamber 30 for receiving and holding the inserted type blank during the character forming operation. Shoulders 38 and 39 on the assembled blocks cooperate to firmly support the lower end of the head portion of each inserted blank. Additional support for the type blank is provided by member 41 which is arranged to be inserted into the end of the central aperture 30 opposite that in which the type blank is inserted and to be held in contact with the type blank shank. The slot 32 opens through the mating block projection which forms shoulder 38, the slot 32 being positioned so that it will be coextensive with the rectangular slot 3 of each inserted type blank.

Figure 7:
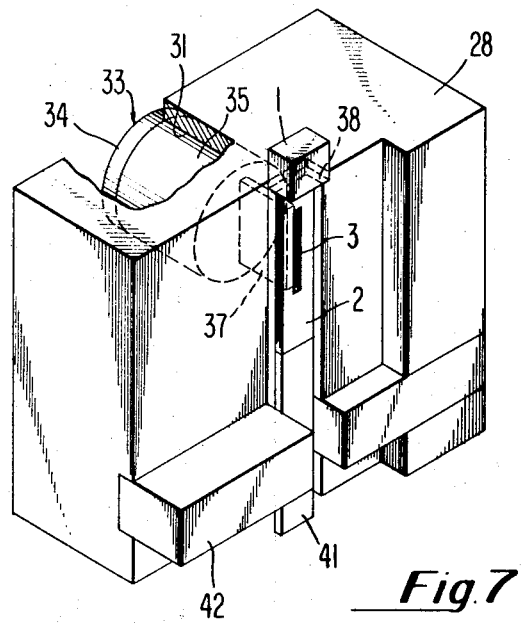
FIG. 7 is a perspective and sectional view of the type blank holding fixture with a type blank held therein.

Referring now to FIG. 7, head portion 1 of the type blank is shown being supported by shoulder 38 of the holding fixture. The plug 33 is inserted into the aperture 31 in the mating block 28 and pressed therein by an external force so that the blade or rectangular knife edged extension 37 is forced through slot 32 and into the rectangular retaining slot 3 of the type blank. The extension 37 snugly fits the slot 3 and prevents unwanted metal flow into the slot 3 when the blank is subjected to the character forming operation while also providing support for the type blank. Additional support for the type blank is provided by member 41 which is held in contact against the end of shank 2 opposite to the type blank head.

In order to facilitate the alignment of the two mating blocks 28 and 29, mating block 28 is shaped with a solid rectangular projection 42 extending crosswise to the type blank accommodating cavity 30 which is slidably receivable in longitudinal recess 43 located in mating block 29.

Since portion 35 of plug 33 is made of a resilient material, preferably Adeprene, the removal of the external force acting on the plug 33 enables the resilient material to return to its original dimensions, thereby automatically withdrawing extension 37 from the elongated slot of the type blank and facilitating the removal of the type blank from the fixture after the character forming operation is completed. In the event the slot in the type blank is misaligned with respect to extension 37 or the type blank is mislocated when it is inserted in the fixture thus preventing extension 37 from passing into slot 3 of the blank, the resiliency of the body 35 is sufficient to enable the pin 36 to compress the body further and thus prevent pin damage or breakage.

Figure 8:
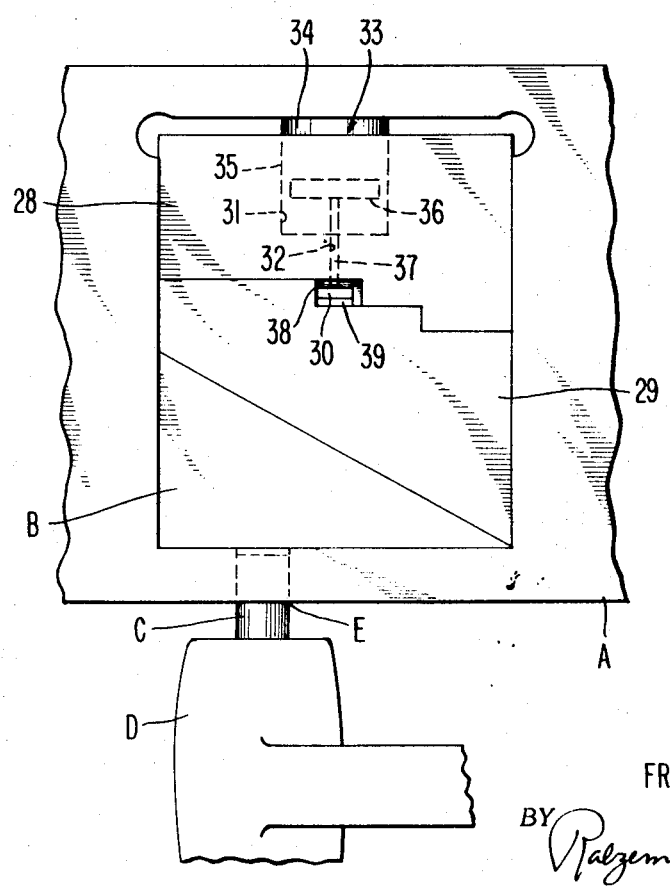
FIG. 8 is a plan view of the holding assembly with the plug inserted, the assembly shown being clamped in a die cavity.

Referring now to FIG. 8, there is shown a top view of the holder assembly of FIG. 4. The plug 33 has been inserted into the aperture 31. The holder assembly is placed in a cavity located within die holder A. A wedge shaped member B is also inserted into the cavity adjacent mating blocks 29. A member C, part of a clamping spindle D, is forced through an aperture E in the die holder and caused to exert pressure on wedge B forcing the holder assembly against the opposite wall of the cavity. The wall exerts an opposing force on the metal disk 34 compressing the resilient body 35 and forcing extension 37 through slot 32 and into the central aperture 30. The extension 37 will pass through slot 3 of each inserted type blank, thereby supporting the blank and also preventing metal flow into the slot.

Figure 9:
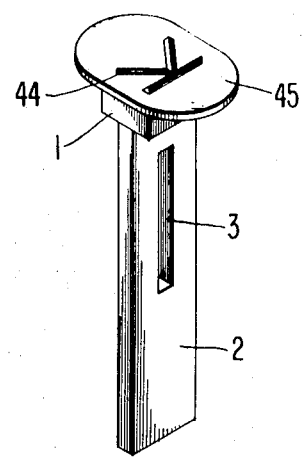
FIG. 9 is a perspective view of a type blank after a print character is formed thereupon.

Referring now to FIG. 9, a print character 44 is shown formed on the head portion 1 of a type blank. The excess metal 45 formed around the periphery of the head 1 is due to metal flow and can be removed in a separate trimming operation. The removal of the excess metal from the head portion 1 of the type blank of FIG. 9 results in the printing type produced by the method of the invention, as shown in FIG. 1.

It is to be understood that the foregoing explanation is by way of illustration only. It will be apparent to those skilled in the art that various changes may be made in the method disclosed herein while utilizing the principles of the invention. For example, printing type may be fabricated by the progressive die technique but with an unapertured or solid shank portion. One or more shoulder abutments may be formed thereon to enable mounting or spring loading of the printing type, the shoulders being work-hardened along with the shank during the production of the type blank. Therefore, it is intended that the invention include all variations of the specific method and articles produced thereby which are within the proper scope and meaning of the appended claims.

What is claimed is:

1. The method of forming from a metal strip a blank having a head portion joined integrally to a shank portion, which comprises the steps of:
    (a) punching a pair of substantially parallel, elongated apertures in the metal strip,
    (b) shaping the metal remaining between the adjacent sides of said apertures to form the head portion having the thickness of the strip and to form the shank portion in the plane of the strip,
    (c) severing the blank from the strip, and
    (d) kneading a printing type character in the surface of the head portion of the severed blank opposite the shank.

2. The method of claim 1, wherein the shaping operation as to the shank portion includes the step of:
    reducing the thickness of the metal in the direction perpendicular to the plane of the strip, widening the metal in the plane of the strip, and hardening the width of the metal, between the apertures to form the shank portion relative to said head portion.

3. The method of producing printing types which comprises the steps of:
    (a) punching a pair of substantially parallel, elongated apertures in a metal strip,
    (b) shaping the metal between the apertures into type blanks each with integrally connected head and shank portions by incrementally forming the strip at a plurality of work forming stations as said strip passes through a progressive die,
    (c) severing each blank as it is completed from the metal strip,
    (d) kneading a printing type character in the surface of the head portion of the severed blank opposite the shank.

4. The method as defined in claim 3, wherein the step of shaping includes hardening said shank portion relative to the head portion of each completed type blank.

5. The method of forming from sheet metal stock a printing type having integrally joined head and shank portions which comprises the steps of:
    (a) punching two closely adjacent, elongated, parallel extending apertures in the stock separated from one another by material of the stock having the general outline of the printing type to be formed,
    (b) subjecting the entire width of the material between the apertures to form the shank portion of the type blank to a die operation to reduce the thickness of the shank portion in the direction perpendicular to the plane of the sheet, to widen the same in the plane of the sheet, and to harden the same relative to the head portion of the type blank,
(c) trimming the type blank to lateral dimensions,
(d) severing the type blank from the metal sheet,
(e) rigidly clamping the shank portion of the type blank, and
(f) subjecting the head portion of the clamped type blank to a die operation to form a printing type character on the surface opposite the shank, the hardened shank portion remaining substantially undistorted during character formation.

6. The method of producing printing type which comprises the steps of:
(a) fabricating type blanks each with integrally connected head and shank portions by passing a strip of relatively soft metal material through a progressive die wherein the material is subjected to the following operations:
(1) punching the metal strip to form pairs of apertures therein,
(2) swaging the metal material remaining between said apertures to form a type blank with integrally connected head and shank portions,
(3) punching a longitudinally extending rectangular slot through the shank portion of the type blank,
(4) trimming the type blank to the desired lateral dimensions,
(5) partially punching the type blank from the metal strip, and
(6) punching the type blank completely from the metal strip, and
(b) thereafter forming a printing type character on the surface of the head portion of each type blank opposite the shank.

7. The method as defined in claim 6 whererin the swaging operation reduces the thickness of the metal material forming the shank portion in the direction perpendicular to the strip and widens it in the plane of the strip.

8. The method as defined in claim 7 wherein the swaging operation hardens the shank portion relative to said head portion thereby preventing metal flow in the shank when the print character is formed on the head portion of the type blank.

9. The method as defined in claim 8 including the step of inserting a rigid member into the slot of the shank portion to prevent change in the size thereof as a print character is formed on the head portion of each type blank.

10. The method as defined in claim 8 including the step of inserting a member consisting of resilient and rigid portions through an aperture in said fixture and applying force to said resilient portion so that said rigid portion of said member passes through the slot in the shank portion of each type blank inserted in said fixture thereby preventing any change in the dimensions of the slot.

11. The method of claim 1, wherein the step of shaping includes the steps of:
swaging the metal to form and harden the shank portion and to form shoulders on the head portion perpendicular to plane of the strip and to the shank portion, and trimming said metal to the lateral dimensions of the blank.

12. The method of claim 11 also including after the step of swaging the steps of:
(1) punching an elongated slot in said shank parallel to the lateral edge thereof, and
(2) trimming said blank to final lateral dimensions.

13. The method of claim 12 wherein the step of severing include the steps of:
offsetting said blank from the plane of said strip, and severing said offset portion from said strip.

14. The method of claim 13 including the additional step of:
preliminarily sizing the lateral dimensions of said blank after the step of widening said shank and prior to the step of punching said slot.

15. The method of claim 1, wherein the step severing includes the steps of:
offsetting a portion of the shaped metal including the blank from the plane of the strip, and
severing the blank from said offset portion.

References Cited

UNITED STATES PATENTS

| | | | |
|---|---|---|---|
| 927,598 | 7/1909 | Richards | 101—401.4 |
| 2,624,935 | 1/1953 | Penker | 101—401.4 |
| 3,091,201 | 5/1963 | Gourley | 113—116 |
| 3,229,357 | 1/1966 | Burstin | 113—119 |
| 3,262,299 | 7/1966 | Hart et al. | 29—149.5 |
| 3,299,493 | 1/1967 | Gehrt et al. | 113—119 |
| 3,309,761 | 3/1967 | Deakin | 113—119 |
| 3,327,372 | 6/1967 | Berg | 113—119 |
| 3,394,454 | 7/1968 | Logan | 113—119 |

CHARLES W. LANHAM, Primary Examiner

E. M. COMBS, Assistant Examiner

U.S. Cl. X.R.

72—377, 379; 113—119; 29—629